Oct. 16, 1951  H. AYCOCK  2,571,517
LATERALLY ROCKING TYPE TIRE REMOVING HAND TOOL
Filed March 27, 1948
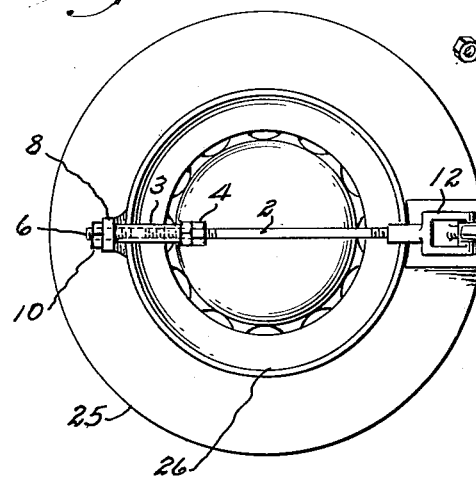
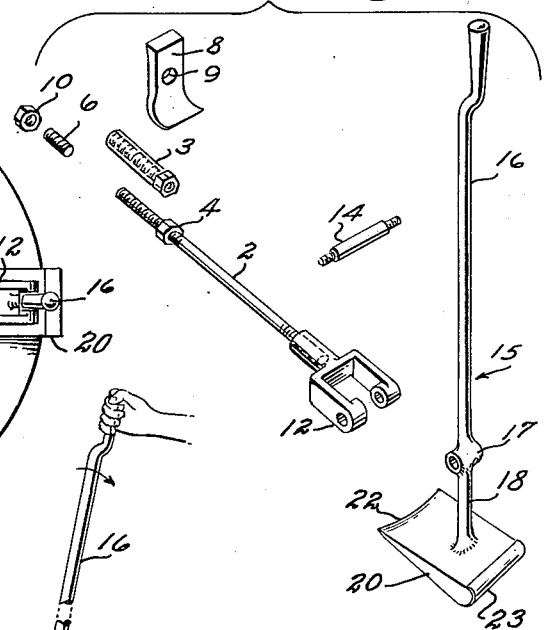
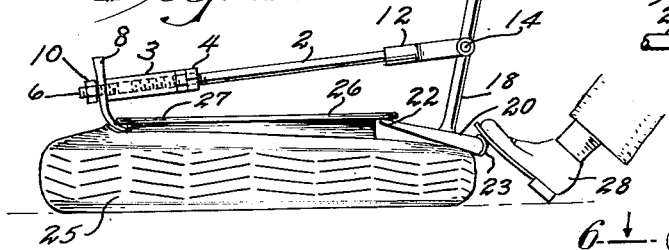
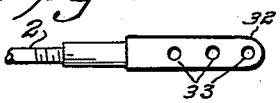
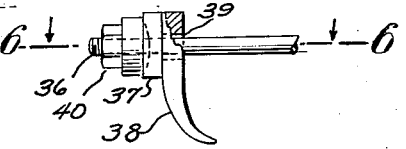
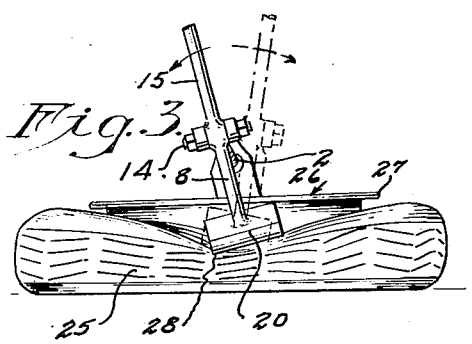
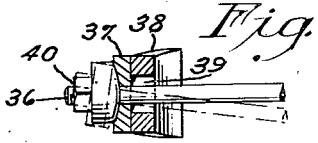
INVENTOR
Hugh Aycock
Nertt L. Norviel
BY  ATTORNEY

Patented Oct. 16, 1951

2,571,517

UNITED STATES PATENT OFFICE 2,571,517

LATERALLY ROCKING TYPE TIRE REMOVING HAND TOOL

Hugh Aycock, Phoenix, Ariz.

Application March 27, 1948, Serial No. 17,496

2 Claims. (Cl. 157—1.17)

This invention pertains to laterally rocking type tire removing hand tool.

Heretofore, the problem of removing tire casings from wheel rims has been attacked in many ways. In some commercial establishments the casings are removed by loosening the bead from the wheel flange by beating with a rubber hammer; in others a large frame is employed having spade-like wedges arranged to push downward on the casing while a spider engages the wheel rim and retains it against movement with respect to these wedges. The power necessary to force a casing from a wheel in this manner is usually provided by a hydraulic piston and cylinder, and the device is necessarily large and cumbersome.

Where conditions require the use of a hand tool for this purpose, mechanism adapted to force the casing off the rim in one continuous operation is impractical. It is more expedient to force the bead from the rim flange piece-meal, from point to point around the rim, than to attempt to force the whole bead off the rim at one time.

In view of this, one of the objects of my invention is to provide a hand tool for removing pneumatic tire casings from wheel rims which will engage the rim flange in diametrically opposite positions, force the tire bead away from the flange at these positions, and then force the bead inward across the face of the rim, one position at a time. The tool, being light and simple to operate, is then released, moved to a new position on the rim, and the casing bead broken away from the flange and forced inward again at the new point.

Another object is to provide a light tool of simple construction for removing tire casings from wheel rims by engaging the rim flange with a hook on one side and a pry wedge at an opposite position; this wedge being arranged so that it can be twisted on its axis to act as a transverse lever by fulcruming one of its edges on the inner face of the rim flange and pressing the other edge on the side of the casing to force it away from the flange.

A further object is to provide a tool for removing tires from rims which will first break a portion of the tire bead from the rim flange and then force the tire bead down on the face of the rim; the tool consisting of a pull bar adapted to be extended diametrically across the rim, having a hook at one end and an angularly extending lever at the other; having an upwardly extending handle portion and a short inner portion carrying a wide wedge shoe adapted to engage the adjacent near side of the rim and force its forward edge between the rim flange and the tire bead, while a foot pad at its outer edge enables the user to hold it down while holding the handle to maintain a clamping action, and rocking the handle transversely to give the wedge a twisting motion.

Another object is to provide the tire removing tool, as above described, with a pull bar which can be easily adjusted to fit various sizes of rims.

Still another object is to provide the wedge blade at the lower end of the handle bar with a flat base, a slightly arcuate inner blade end to conform to the contour of the rim and side edges spaced so that, when it is twisted axially, one corner of the blade engages the wheel rim and the opposite side edge mashes down on the tire casing.

Other objects will appear hereinafter.

I attain the foregoing objects by means of the device and mechanism illustrated in the accompanying drawings in which—

Figure 1 is a plan view of the device as applied to a wheel rim and tire;

Figure 2, side elevation thereof;

Figure 3, an end elevation thereof;

Figure 4, an exploded view of the several parts of the device;

Figure 5, a side elevation of the outer rim flange hook, drawn on an enlarged scale showing a modified form of bar attachment;

Figure 6, a plan view of said hook, with the top sectioned off on line 6—6, Figure 5; and Figure 7, a side elevation of a modified form of bar fork.

Similar numerals refer to similar parts in the several views.

Pull bar 2 is threaded at its outer end into an adjusting shank 3, and can be locked in position by jam nut 4. A stud 6 is threaded into the outer end of this shank. An outer rim flange hook 8 has a hole 9 to receive stud 6. Stud nut 10, holds this hook tightly against the outer end of shank 3, and the hook 8 twists when bar 2 is turned on its axis. In the form shown in Figures 5 and 6 the hook 38 is provided with a slot 39 to receive stud 6, or bar end 36, and a socket plate 37 attached to its outer face. Stud nut 40 has a rounded semi-spherical inner face with its curvature mating that of the socket plate. This arrangement permits hook 38 to remain stationary when bar 2 is turned on its axis. Since in removing tires from certain rims, it is more efficient to maintain the hook stationary than to have it twist.

The inner end of bar 2 is provided with a fork 12 to receive fulcrum pin 14. An angularly extending lever 15 has a handle portion 16 adapted to extend upward when the bar is horizontal, as shown in Figures 1, 2 and 3. A boss 17 at the base of this handle portion is drilled to receive pin 14, and below this boss there is a comparatively short stem 18. A wedge shoe 20 is attached to the lower end of this stem and has a spade-like forward portion terminating in a concave edge 22, conforming to the curve of the rim face. A foot pad 23 is formed at its rear edge.

Obviously, to secure desired leverage the stem 18 is much shorter than the handle portion 16 of lever 15.

In use, the tire 25 on rim 26 may be laid flat on the floor. The bar 2 is then extended horizontally and diametrically across the rim and outer hook 8 (or 38) engaged just under the flange 27. Handle 15 is grasped by the user and the forward edge 22 of wedge shoe 20 placed just under flange 27 of the rim. The operator's foot 28 is at the same time placed on wedge foot pad 23 and downward pressure applied while handle 15 is pulled to the rear in a direction away from the tire. This forces the hook 8 and the spade edge 22 of shoe 20 beneath the rim flange at diametrically opposite positions.

Then, while these two wedging elements are maintained in clamping position by a continuous rearward tension on lever handle 15, it is rocked laterally, as indicated by the dotted outline, in Figure 3. This gives wedge 20 an axial twisting motion so that its edge 22 quickly reaches the annular face of the rim at the bottom of the flange 27. During this operation, the front corners of the wedge act alternately as fulcrums and the opposite side edges as work elements; each edge alternately pressing downward on the tire casing 25 and mashing it downward on this rim and away from flange 27, as indicated by numeral 28.

After the tire bead has been broken away from the flange in one position, the whole device is released and quickly moved to another similar position and the process repeated. Only a few operations are required to completely loosen and remove the tire.

The modified form of front or outer hook 38 may be used on rims of the so-called "safety" type. Here the hook is engaged over the flange and the wedge operated as above explained. The ball and socket joint between hook plate 37 and nut 40 provides free pivotal motion for bar 2 when it is moved transversely as handle 15 is rocked.

While a certain amount of adjustment of the length of bar 2 is afforded by screwing the outer end of this bar into or out of shank 3, still further adjustment can be provided by using the fork 32 (Figure 7) in place of fork 12. This fork has several pairs of holes 33 adapted to receive pin 14. Coarse adjustment of the effective length of bar 2 can be made by changing pin 14 in these holes, and final adjustment can be made by threading the shank on bar 2. In this way the effective length of the bar can be varied so that when the hook 8 and wedge 20 is applied the handle 15 will be in the most effective position.

This device can be used either on light wheels having drop center rims, or on heavy wheel rims having one removable flange. In either case the operations are the same, although the drop center rims can obviously be removed more quickly.

Since the exact form of the several parts is subject to wide variation, it is intended that the following claims be given a liberal interpretation.

I claim:

1. A rocking type hand tool for removing tire casings from wheel rims having flanges, comprising a pull bar having a threaded outer end, a fork affixed to its inner end having a plurality of pairs of transverse holes, a shank threaded onto the outer end of said pull bar, a threaded stud screwed into the outer end of said shank, a rim hook having a socket plate attached to its outer face, a transverse slot through said rim hook and socket plate to loosely hold said stud, a nut threaded on said stud adapted to hold said hook on said stud and having a rounded inner face adapted to engage in the socket in said socket plate, a lever having a handle on its upper portion, a flat rectangular wedge shoe on its lower end, and an intermediate boss transversely drilled to receive a bearing pin; and a transverse bearing pin extending through a pair of holes in said fork and thru said boss; said wedge shoe having a spade-like front portion terminating in a concavely curved front edge, adapted to engage under a rim flange, lateral edges adapted to press downward on a tire side wall, and a foot pad at its rear end, adapted to extend beyond the periphery of a tire to be removed from said rim.

2. A rocking type hand tool for removing tire casings from wheel rims having flanges comprising a pull bar having a threaded outer end, a fork affixed to its inner end having a plurality of pairs of transverse holes, a rim hook having a socket plate attached to its outer face, a transverse slot through said rim hook and socket plate to loosely receive said pull bar, a nut adapted to thread on the outer end of the said pull bar and hold said hook thereon having a rounded inner face adapted to engage in the socket in said socket plate, a lever having a handle on its upper portion, a flat rectangular wedge shoe on its lower end, and an intermediate boss transversely drilled to receive a bearing pin; and a transverse bearing pin extending through said transverse holes in said fork and said boss; said wedge shoe having a spade-like front portion terminating in a concavely curved front edge, adapted to engage under a rim flange, lateral edges adapted to press downward on a tire side wall, and a foot pad at its rear end adapted to extend beyond the periphery of a tire to be removed from said rim.

HUGH AYCOCK.

REFERENCES CITED

The following references are of record in the file of this patent:

UNITED STATES PATENTS

| Number | Name | Date |
| --- | --- | --- |
| 1,116,468 | Nelson | Nov. 10, 1914 |
| 1,639,887 | Hatfield | Aug. 23, 1927 |
| 2,226,757 | Ewell | Dec. 31, 1940 |
| 2,305,886 | Mahler | Dec. 22, 1942 |
| 2,307,473 | Stinaff | Jan. 5, 1943 |
| 2,319,155 | Passanante et al. | May 11, 1943 |
| 2,367,638 | McCulloch | Jan. 16, 1945 |
| 2,399,146 | Schumann | Apr. 23, 1946 |
| 2,404,583 | McCollister | July 23, 1946 |
| 2,495,117 | McCollister | Jan. 17, 1950 |